(12) United States Patent
Kim et al.

(10) Patent No.: US 8,036,085 B2
(45) Date of Patent: Oct. 11, 2011

(54) RECORDING MEDIUM AND METHOD AND APPARATUS FOR RECORDING DATA ON THE SAME

(75) Inventors: Byung Jin Kim, Seongnam-si (KR); Sung Wan Park, Suwon-si (KR)

(73) Assignee: LG Electronics Inc., Seoul (KR)

( * ) Notice: Subject to any disclaimer, the term of this patent is extended or adjusted under 35 U.S.C. 154(b) by 723 days.

(21) Appl. No.: 11/579,111

(22) PCT Filed: May 4, 2005

(86) PCT No.: PCT/KR2005/001299
§ 371 (c)(1),
(2), (4) Date: Aug. 18, 2008

(87) PCT Pub. No.: WO2005/104670
PCT Pub. Date: Nov. 10, 2005

(65) Prior Publication Data
US 2009/0003173 A1      Jan. 1, 2009

(30) Foreign Application Priority Data

May 4, 2004   (KR) .................. 10-2004-0031259

(51) Int. Cl.
*G11B 7/20* (2006.01)
(52) U.S. Cl. .............. 369/94; 369/47.12; 369/53.12; 369/275.1; 369/275.3
(58) Field of Classification Search ............. 369/47.12, 369/94, 47.17, 112.23, 47.19, 47.28, 53.12, 369/275.1, 275.3; 714/5
See application file for complete search history.

(56) References Cited

U.S. PATENT DOCUMENTS

| | | | |
|---|---|---|---|
| 6,163,521 A * | 12/2000 | Konishi et al. | 369/275.3 |
| 6,285,638 B1 * | 9/2001 | Konishi et al. | 369/47.19 |
| 7,363,530 B2 * | 4/2008 | Yoshida et al. | 714/5 |
| 7,394,739 B2 * | 7/2008 | Sawabe et al. | 369/53.22 |
| 2004/0013059 A1 * | 1/2004 | Sasaki et al. | 369/47.12 |
| 2004/0076097 A1 * | 4/2004 | Sawabe et al. | 369/53.22 |
| 2005/0078577 A1 * | 4/2005 | Horie | 369/47.28 |
| 2005/0169609 A1 * | 8/2005 | Sawabe et al. | 386/95 |
| 2006/0182009 A1 * | 8/2006 | Horie | 369/275.1 |

FOREIGN PATENT DOCUMENTS

CN        1435836        8/2003

(Continued)

OTHER PUBLICATIONS

Korean Office Action dated Aug. 30, 2010 issued in corresponding Korean application No. 10-2004-0031259.
International Search report issued Nov. 17, 2005 in International Patent Application No. PCT/KR2005/001299.

(Continued)

*Primary Examiner* — Thuy Pardo
(74) *Attorney, Agent, or Firm* — Harness, Dickey & Pierce, P.L.C.

(57) ABSTRACT

AV stream files and original management files are initially recorded in a first data recordable area of an optical disc. After the recordation of the original management files in the first data recordable area, at least one backup management file is recorded in a second recordable area of the disc. When associated original file system information is recorded in the first data recordable area after the recordation of the backup management file, backup file system information is recorded in a third data recordable area. All of the first, second, and third data recordable areas are closed after the recordation of the backup file system information.

31 Claims, 11 Drawing Sheets

FOREIGN PATENT DOCUMENTS

| | | |
|---|---|---|
| EP | 1008987 A2 | 6/2000 |
| EP | 1398783 A1 | 3/2004 |
| JP | 2004079085 A | 3/2004 |
| KR | 10-2001-0034241 | 4/2001 |

OTHER PUBLICATIONS

Chinese Patent Gazette dated Dec. 8, 2010 issued in corresponding Chinese application No. 200580014417.2.

\* cited by examiner

RECORDING MEDIUM AND METHOD AND APPARATUS FOR RECORDING DATA ON THE SAME

TECHNICAL FIELD

The present invention relates to a recording medium, and more particularly, to a recording medium and a method and apparatus for recording data on the same. Although the present invention is suitable for a wide scope of applications, it is particularly suitable for initially allocating areas for recording data within a high-density write-once recording medium and recording data within the recording medium (e.g., optical disc) by using the same.

BACKGROUND ART

Optical discs are widely used as a recording medium for recording mass data. Presently, among a wide range of optical discs, a new high-density optical recording medium, such as a Blu-ray Disc (hereinafter referred to as "BD"), is under development for writing and storing high definition video and audio data. Currently, global standard technical specifications of the Blu-ray Disc (BD), which is known to be the next generation technology, are under establishment as a next generation optical recording solution that is able to record and store data significantly surpassing the conventional DVD, along with many other digital apparatuses.

Accordingly, the write-once blu-ray disc (BD-WO) is currently under discussion as the blu-ray disc standard. However, since the Blu-ray Disc (BD-WO) standards are yet to be completed, there have been many difficulties in developing a complete optical recording and reproducing apparatus. More specifically, in order to efficiently reproduce the data recorded on the blu-ray disc (BD-WO), a management file and a file system information for managing the files having data recorded therein are necessary and should be provided by a systematic and standardized method. However, in the current blu-ray disc (BD-WO) standard, since a consolidated standard for the method for recording and reproducing the management file and the file system information has not been completed, there still remain many restrictions in fully developing blu-ray disc (BD)-based optical recording and reproducing apparatuses.

DISCLOSURE OF INVENTION

An object of the present invention devised to solve the problem lies on providing a recording medium and a method and apparatus for recording data on the same that can substantially obviate one or more problems due to limitations and disadvantages of the related art.

Another object of the present invention devised to solve the problem lies on providing a new method for recording data on a recording medium that is suitable for a write-once recording medium.

Another object of the present invention devised to solve the problem lies on providing a method for allocating in advance area for recording stream files, management files, and file system information within a recording medium.

A further object of the present invention devised to solve the problem lies on providing an efficient method for recording data on the allocated area.

The object of the present invention can be achieved by providing a method for recording data on a recording medium having a user data area including recording AV stream files and original management files in a first data recordable area included in the user data area, recording at least one backup management file in a second data recordable area included in the user data area after the recordation of the original management files in the first data recordable area, and recording associated original file system information in the first data recordable area after the recordation of the at least one backup management file in the second data recordable area.

Herein, the at least one backup management file may include at least one of information, menu, mark, playlist, and clip information files required for reproducing the AV stream files recorded in the first data recordable area. The method for recording data on a recording medium may further include recording backup file system information in a third data recordable area after recordation of the associated original file system information in the first data recordable area. The method may also include closing the first, second, and third data recordable areas after the recordation of the backup file system information in the third data recordable area.

In addition, the backup file system information may include at least one of volume structure information and file structure information. The volume structure information may include volume structure descriptors and anchor information indicating locations of the volume structure descriptors. And, the file structure information may include metadata files and a first file entry indicating locations of the metadata files. The first file entry may include a metadata partition map if any one of the metadata files is partitioned, the metadata partition map indicating locations of the partitioned metadata file. And, finally, the file structure information may further include metadata mirror files and a second file entry indicating locations of the metadata mirror files.

In another aspect of the present invention, provided herein is, a recording medium for recording data, comprising a user data area including a first data recordable area configured to store AV streams and original management files, and a second data recordable area configured to store at least one backup management file after the original management files are stored in the first data recordable area, wherein the first data recordable area is further configured to store associated original file system information after the at least one backup management file is stored in the second data recordable area.

In a further aspect of the present invention, provided herein is, an apparatus for recording data on a recording medium having a user data area including a driver configured to drive an optical recording device to record data on a recording medium, and a controller configured to control the driver to record AV stream files and original management files in a first data recordable area, to record at least one backup management file in a second data recordable area after the recordation of the original management files in the first data recordable area, and to record associated original file system information in the first data recordable area after the recordation of the at least one backup management file in the second data recordable area, the first and second data recordable areas being included in the user data area.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

In this detailed description, "recording medium" refers to all types of medium that can record data and broadly includes all types of medium regardless of the recording method, such as an optical disc, a magnetic tape, and so on. Hereinafter, for simplicity of the description of the present invention, the optical disc and, more specifically, the "Blu-ray disc (BD)" will be given as an example of the recording medium proposed herein. However, it will be apparent that the spirit or scope of the present invention may be equally applied to other types of recording medium. Additionally, in the present invention, a "management File" refers to a file for recording reproduction management information for reproducing stream files that are recorded by a user. The management File will be described in detail with reference to FIG. 5. A "file allocation" refers to allocating areas for recording files, wherein only the file information of a specific file is recorded within a corresponding allocated area.

Furthermore, in the present invention, a "file system" refers to a set of information not only managing a logical structure (hereinafter referred to as a "Disc Volume") of the entire optical disc, but also managing all of the files recorded within the optical disc. Herein, such information is only recognized by the system and not recognized by the user. Therefore, in the present invention, a "file system information" includes volume structure information and file structure information. The volume structure information includes volume structure descriptors defining the structure of a disc volume, and it further includes anchor information (Anchor) indicating the locations of the volume structure descriptors. On the other hand, the file structure information includes location and attribute information of various data files recorded on the disc. For example, the file structure information may include metadata files (MD Files) and a metadata-file file entry (MD File FE) which indicates the locations of the metadata files. If a metadata file is partitioned (scattered) within the disc, the metadata file entry may include a metadata partition map which indicates the location of the partitioned metadata file. In addition, the file structure information may further include metadata mirror files (MD Mirror Files), which are backup files of the metadata files, and a metadata-mirror-file file entry (MDM File FE) indicating the locations of the metadata mirror files. And, the most commonly used file system type is a "Universal Disc Format (UDF)", which will be given as an example for describing the present invention.

Hereinafter, various methods of allocating area for recording files within the write-once optical disc and method for recording data within the allocated areas will now be described in detail with reference to the accompanying drawings.

Figure 1:
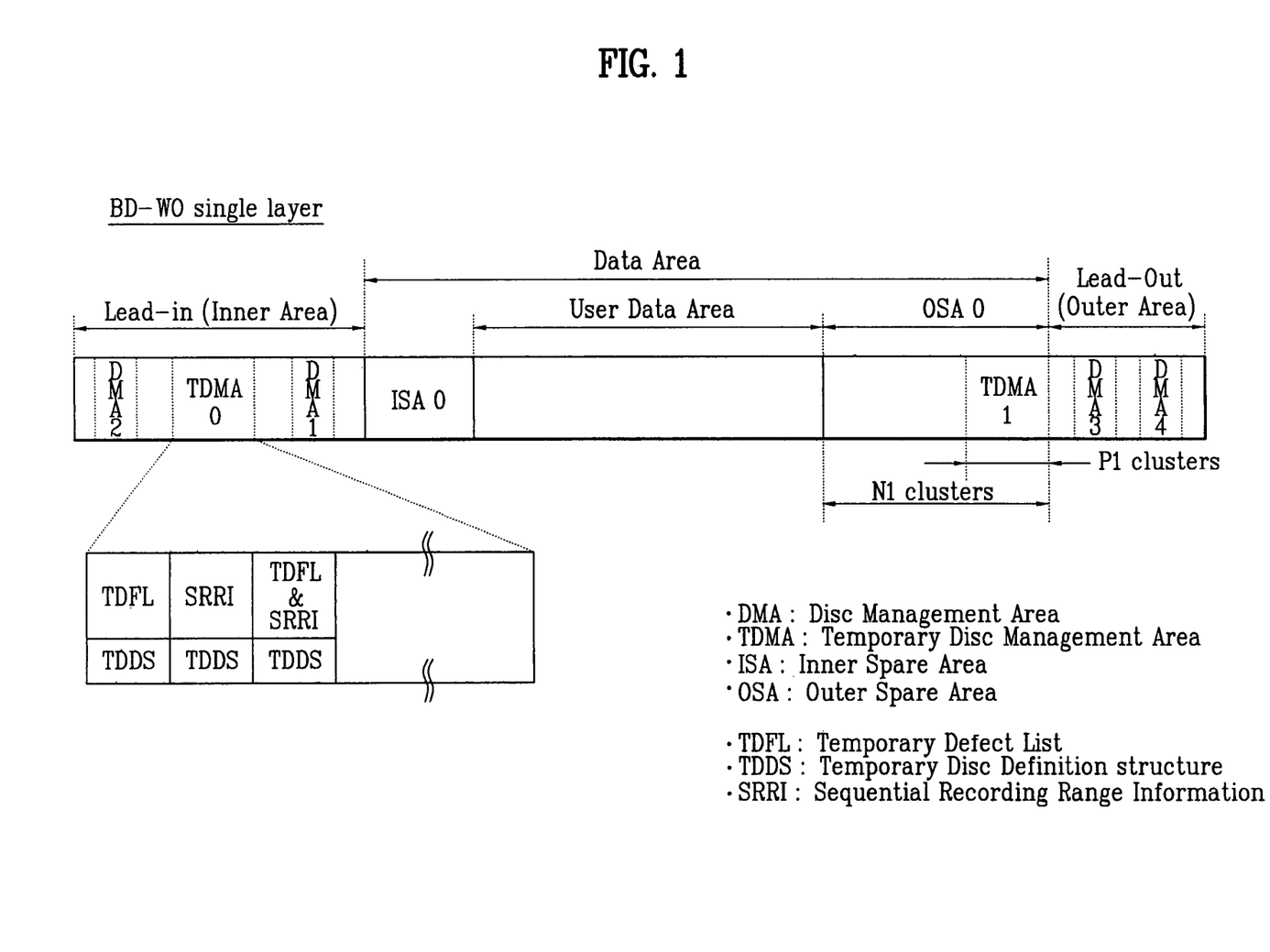
FIG. 1 illustrates a single-layer structure of a write-once optical disc according to the present invention.

FIG. 1 illustrates a single-layer structure of a write-once blu-ray disc (BD-WO) according to the present invention. Referring to FIG. 1, the write-once optical disc is includes a spare area, a Temporary Disc Management Area (TDMA), and a Disc Management Area (DMA). More specifically, the spare area is used for managing defects, the TDMA is for recording management information prior to finalization (or closing) of the disc, and the DMA is for recording a final management information after the finalization (or closing) of the disc.

Due to the characteristics of the write-once optical disc, defect management information, which occurs during the usage of the disc, and general management information, which indicate the recording status within the disc, are both included in the TDMA. And, when the disc is finalized, recording can no longer be performed on the corresponding disc, and so the final management information of the TDMA is relocated to the DMA. Accordingly, there are two types of TDMA: TDMA0 and TDMA1. The TDMA0 has a fixed size (e.g., 2048 clusters) within a Lead-in area and can be allocated whenever the disc is initialized. The TDMA1 has a variable size that is associated with the size of an Outer Spare Area 0 (OSA0) (i.e., N1 clusters) within the Outer Spare Area (OSA) having a variable size among the spare areas within the data zone. Herein, allocation of the TDMA1 is decided when initializing the disc, and when allocation is decided, the TDMA1 that is to be used exists after the use of the TDMA0 is completed.

The disc management information is recorded in the TDMA (TDMA0, TDMA1), the types of the disc management information being recorded in the TDMA of the write-once optical disc according to the present invention are illustrated in the lower portion of FIG. 1. Additionally, the disc management information includes 3 types: a Temporary Defect List, a Sequential Recording Range Information, and a Temporary Disc Definition Structure. The Temporary Defect List (hereinafter referred to as "TDFL") is a defect management information recording a defect list for managing a defect area of the disc. The Sequential Recording Range Information (hereinafter referred to as "SRRI") indicates a recording status within the disc in a Sequential Recording Mode (SRM). Finally, the Temporary Disc Definition Structure (hereinafter referred to as "TDDS") records various types of necessary information within the disc including a pointer for designating positions of a recent TDFL and SRRI.

Moreover, the management information is recorded in the TDMA whenever the information are required to be updated. Most particularly, since the most recent information should always be recorded in the TDDS, all updated information is recorded in the TDDS as well as one of the TDFL and the SRRI. However, it is preferable that the updated information is recorded to have the size of 1 sector. Furthermore, when recordable user data area or TDMA no longer remains in the disc, or when the user no longer desires recording to be performed on the disc, the disc is finalized, and, among the management information recorded in the TDMA, the last management information that has been most recently recorded in reallocated to the DMA and recorded therein.

Hereinafter, various types of Sequential Recording Ranges allocated within the disc for a Sequential Recording Mode on the write-once optical disc according to the present invention and a recording method using such Sequential Recording Ranges will now be described in detail. First of all, the Sequential Recording Range (hereinafter referred to as "SRR") refers to an area allocated for recording data within the write-once optical disc such as the BD-WO. The types of SRRs may be diversely defined as required or while performing data recording, which are illustrates in FIGS. 2A to 2D. FIGS. 2A to 2D illustrate various types of open SRRs of the write-once optical disc according to the present invention. An open SRR refers to an SRR on which data can be recorded in a corresponding area. And, an SRR that can be recorded indicates that a Next Writable Address (NWA) is included in the SRR. Therefore, the open SRR refers to an SRR having an NWA, and an SRR that does not have an NWA and that cannot be recorded is a closed SRR. The closed SRR will be described in detail with reference to FIGS. 3A to 3C in a later process.

Figure 2A:
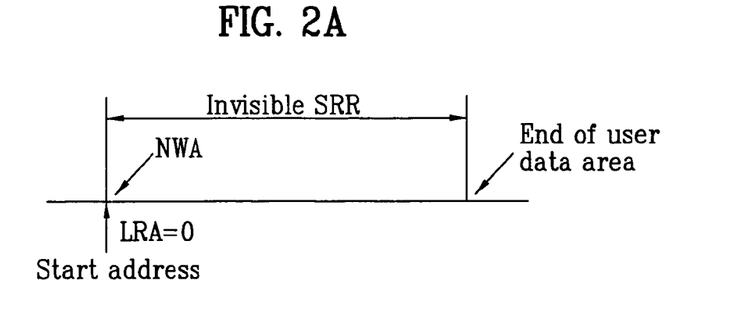
FIGS. 2A to 2D illustrate various types of open SRRs of the write-once optical disc according to the present invention.
Figure 2B:
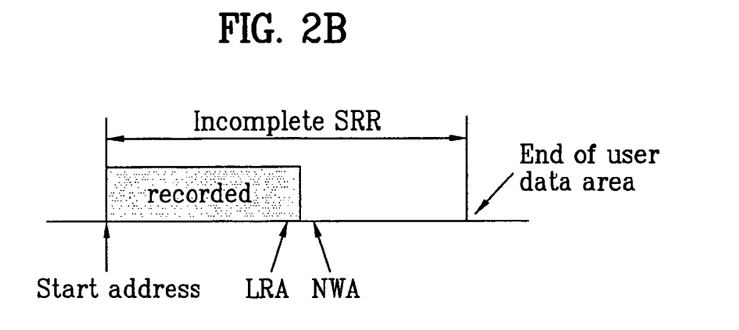

FIG. 2A illustrates an Invisible SRR, which is a first type of open SRRs. Referring to FIG. 2A, the Invisible SRR refers to an SRR that is always formed on an outermost circumferential region of the disc or on a first blank disc. In other words, the Invisible SRR refers to an area on which data recording has not yet been performed. More specifically, only a start address is defined in the Invisible SRR, and the end of this area will correspond to an end of the user data area. Also, as data recording has not yet been performed, "Last Recorded Area (LRA)=0" indicating the location of the last recorded area is included in the Invisible SRR, and the NWA has the same value as a start address. FIG. 2B illustrates an Incomplete SRR, which is a second type of open SRRs. The Incomplete SRR refers to data recording being partially performed on the Invisible SRR of FIG. 2A. More specifically, only a Start address is defined in the Incomplete SRR, just as in the Invisible SRR, and an end of the area is the End of the user data area. However, as data recording is partially performed, the LRA indicates the last position in which normal data is recorded. Therefore, the NWA becomes a set of information corresponding to a fore-end position of a cluster following the LRA.

Figure 2C:
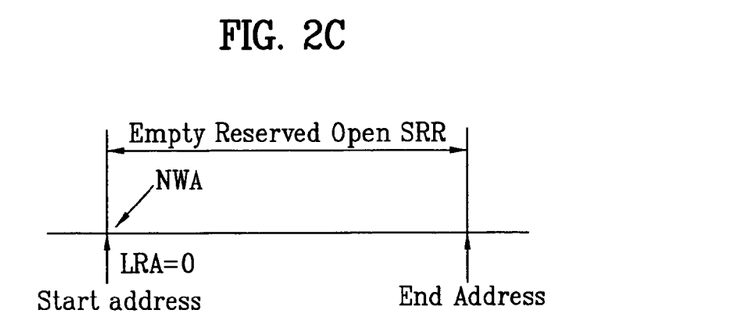
Figure 2D:
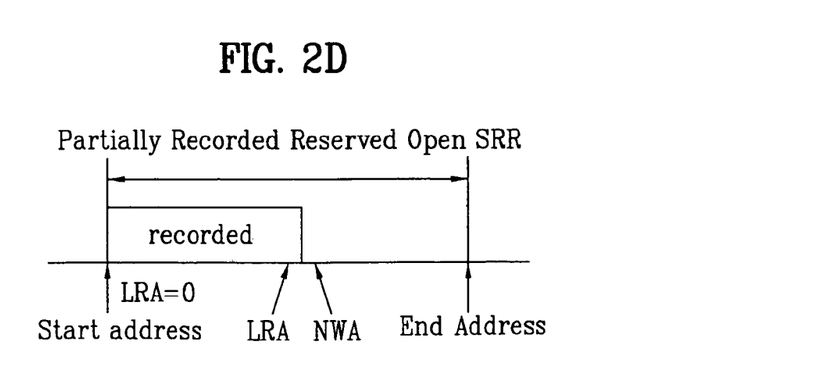

FIG. 2C illustrates an Empty open SRR, which is a third type of open SRRs. Unlike the Invisible SRR and the Incomplete SRR shown in FIG. 2A and FIG. 2B, the Empty open SRR refers to an SRR formed in a middle region of the disc, and not the outermost circumferential region of the disc, for recording data. More specifically, the Empty open SRR corresponds to when a user or a host creates an open SRR for recording data but does not yet perform the recording of data. In other words, since the open SRR is provided with unrecorded Start address and End address, the LRA is equal to '0' (i.e., LRA=0), and the NWA value is equal to the Start address. FIG. 2D illustrates a Partially recorded open SRR, which is a fourth type of open SRRs. Referring to FIG. 2D, the Partially recorded open SRR refers to the Empty open SRR of FIG. 2C being partially recorded. Therefore, the Partially recorded open SRR is provided with a Start address and an End address. And, as data recording is partially performed, the LRA indicates the last position in which normal data is recorded. Therefore, the NWA becomes a set of information corresponding to a fore-end position of a cluster following the LRA. In the write-once optical disc, the number of the above-described open SRRs may be restricted. Accordingly, a maximum of 16 open SRR may be included in the write-once blu-ray disc (BD-WO).

Figure 3A:
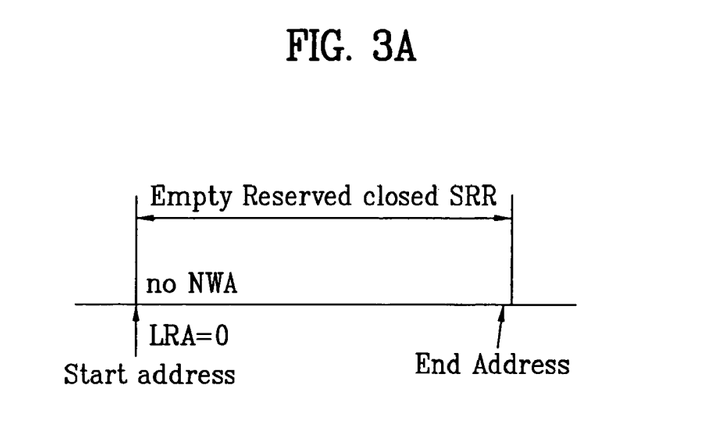
FIGS. 3A to 3C illustrate various types of closed SRRs of the write-once optical disc according to the present invention.
Figure 3B:
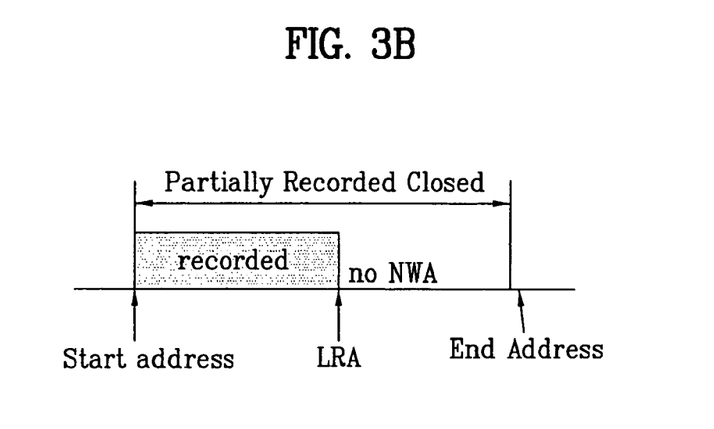
Figure 3C:
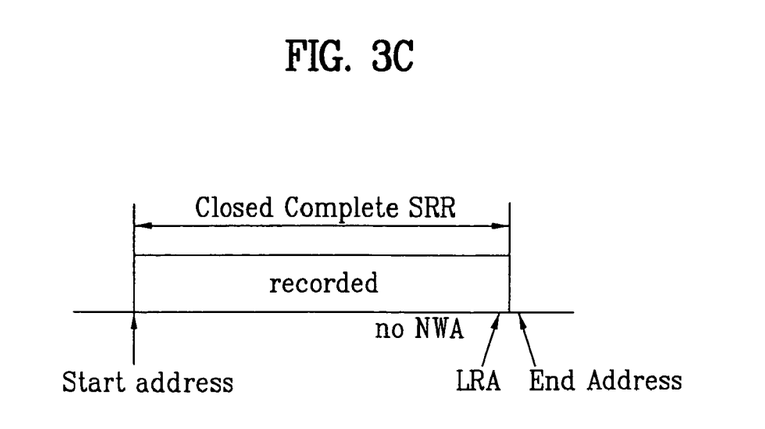

FIGS. 3A to 3C illustrate various types of closed SRRs of the write-once optical disc according to the present invention. Herein, a "closed SRR" refers to an SRR wherein data recording is impossible (or cannot be performed) in the corresponding area, and data recording being "impossible" means that the SRR does not have a "Next Writable Address (NWA)" information. The closed SRR may be formed either when all data recording is completed in the corresponding area, or when the SRR is forcibly closed in accordance with a closing command made by the user or the host, even when recordable area still remain in the corresponding area.

FIG. 3A illustrates an Empty closed SRR, which is a first type of closed SRRs. Referring to FIG. 3A, the Empty closed SRR corresponds to the Empty open SRR of FIG. 2C being closed, in accordance with a closing command, without data recording. FIG. 3B illustrates a Partially recorded closed SRR, which is a second type of closed SRRs. Referring to FIG. 3B, the Partially recorded closed SRR refers to the Partially recorded open SRR of FIG. 2D being closed, in accordance with a closing command. And, FIG. 3C illustrates a complete SRR, which is a third type of closed SRRs. Referring to FIG. FIG. 3C, the complete SRR refers to an SRR in which recording of normal user data is fully completed until the end of the corresponding area.

The information on each of the SRRs described in FIG. 2A to FIG. 3C is the SRRI that is recorded in the TDMA. Information on all open SRRs included in the current disc and information of the Start address and LRA of all SRRs are recorded in the SRRI. Thus, by acquiring the most recent SRRI, the optical recording and reproducing apparatus (shown in FIG. 8) is capable of reading information on the recordable areas (open SRRs) and the recording-completed areas (closed SRRs) within the current disc. Accordingly, by using the read information, recording and reproduction can be performed on the write-once optical disc.

Figure 4:
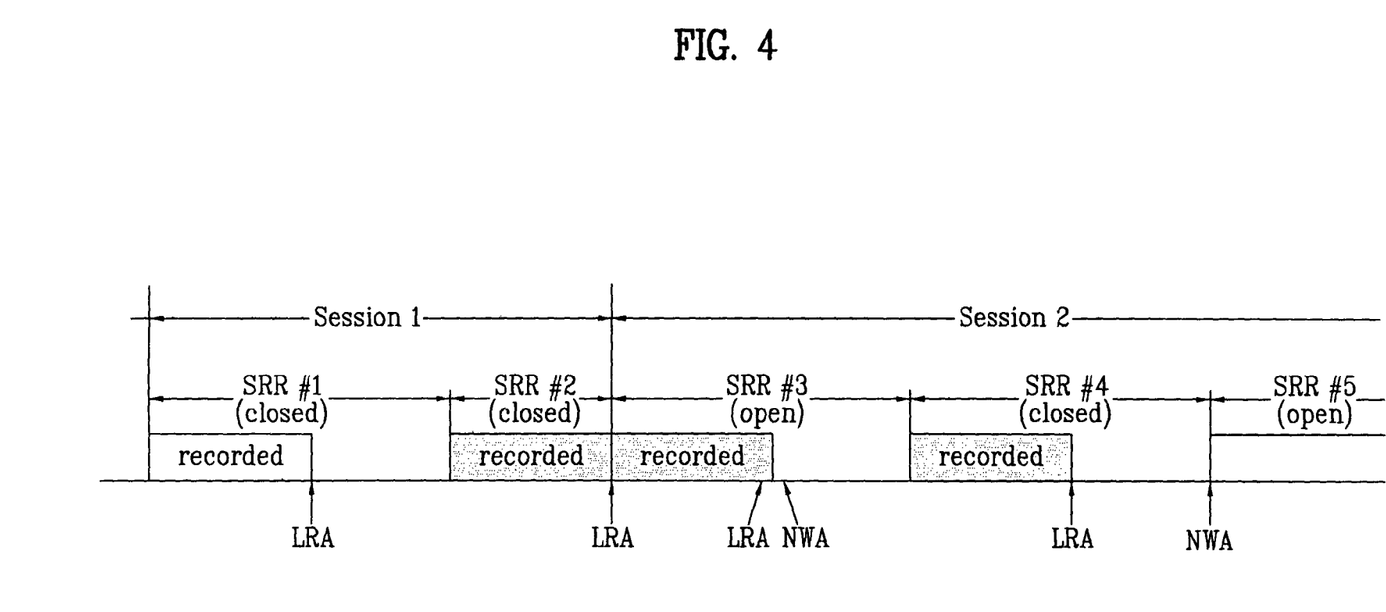
FIG. 4 illustrates a method for recording data on a multi-session applicable to the present invention.

FIG. 4 illustrates an example of a method for recording data by using the SRR and an example of applying a session according to the present invention. Herein, a "session" refers to a recording unit consisting of at least one SRR and being of a level higher than the SRR. Generally, a plurality of sessions, which is also referred to as a multi-session, may be applied in an optical disc. When the multi-session is applied, only the last session becomes the recordable session, whereas all of the previous sessions are closed. Accordingly, all of the SRRs existing within the previous sessions become closed SRRs. For example, when SRR #1 and SRR #2 are initially allocated within session 1 of the disc and the corresponding session 1 is eventually ended (or closed), and when the user or host wishes to open a new session 2, the SRR #1 and SRR #2 of the previous session 1 become closed SRRs, so that data recording can no longer be performed thereon.

Subsequently, when SRR #3 and SRR #4 are allocated within the newly open session 2, SRR #5 automatically becomes the Invisible open SRR, and so SRR #3, SRR #4, and SRR #5 would all become recordable areas. However, FIG. 4 illustrates an example of the SRR #4 forcibly becoming a closed SRR in accordance with a closing command from the user or host, so that data recording can no longer be performed on the SRR #4. More specifically, in a recordable session, at least one open SRR is sufficient, and so all of the SRRs existing in the recordable session do not necessarily have to be open SRRs. Therefore, the final recording status of the disc, shown in FIG. 4, can be verified from the SRRI recorded on the TDMA. And, from the recording status information within the SRRI, it can be known that session 2 is currently being used and that SRR #3 and SRR #5 within session 2 are recordable areas (open SRRs). It can also be known that session 1 is an area in which data recording has already been completed.

Figure 5:
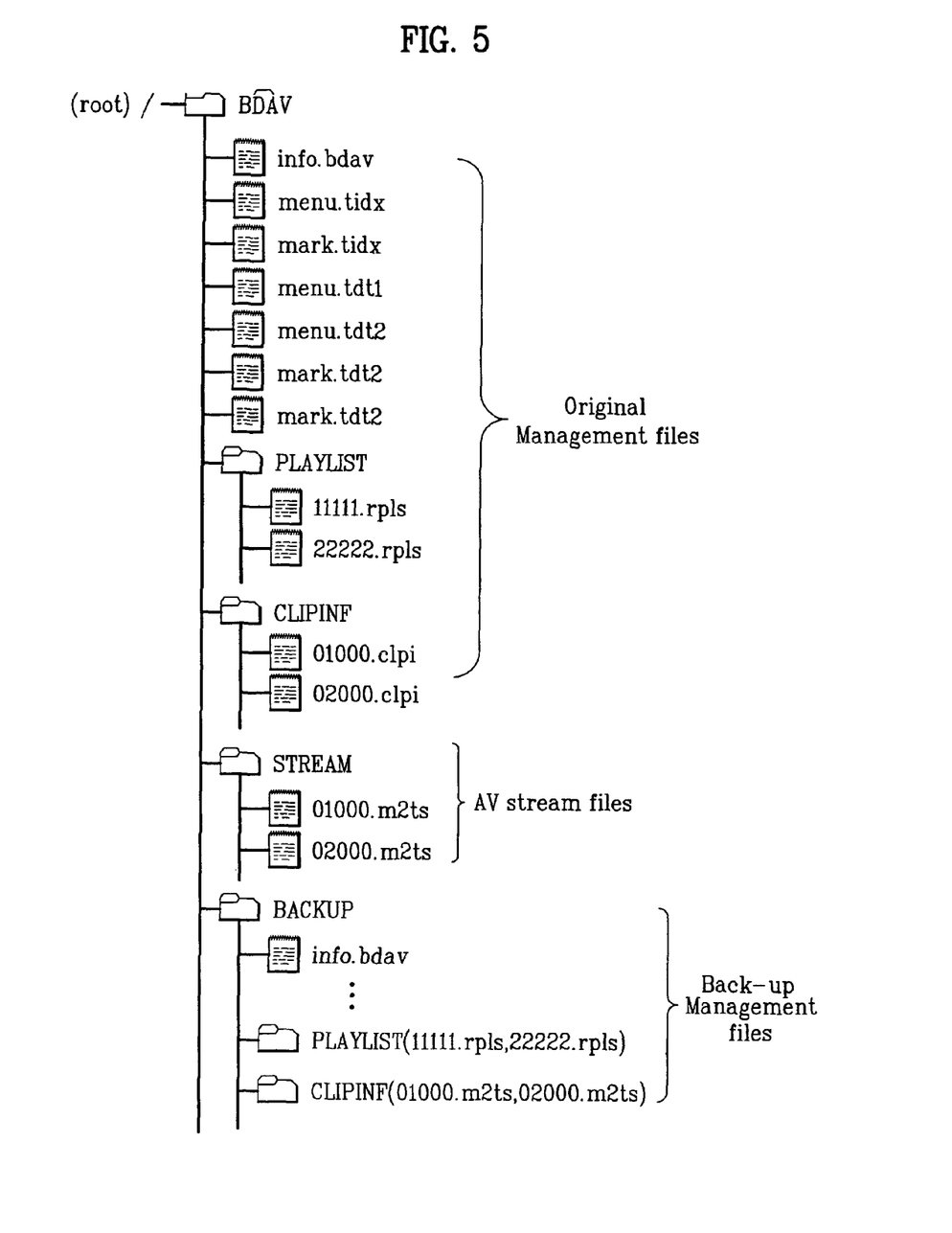
FIG. 5 illustrates a file structure applicable to the present invention.

FIG. 5 illustrates a file structure applicable to write-once optical disc according to the present invention. Referring to FIG. 5, at least one BD directory (BDAV) is included in a root directory (root). Each BD directory includes an info file (info.bdav), menu files (menu.tidx, menu.tdt1, menu.tdt2), and mark files (mark.tidx, mark.tdt1, mark.tdt2), which represent general files that are used when interacting with one or more users. Each BD directory includes three file directories including data to be reproduced, and information required for reproducing the data. The file directories included in each BD directory are a stream directory (STREAM), a playlist directory (PLAYLIST), and a clip information directory (CLIPINF). The stream directory includes audio/video (AV) stream (hereinafter referred to as "AV stream") files. More specifically, the AV streams (01000.m2ts, 02000.m2ts) are generally recorded on a specific area within the disc and represent AV data (or PC data).

Further, the clip information directory (CLIPINF) includes clip information files (*.clpi) being in one-to-one correspondence with each of the stream files (*.m2ts) included in the stream directory. A clip information file (*.clpi) includes property information and timing information of a corresponding stream file (*.m2ts). In the BD standard, each pair of a stream file (*.m2ts) and its corresponding clip information file (*.clpi), which are in one-to-one correspondence with one another, is designated as a "clip". For example, 01000.clpi included in the CLIPINF includes the property information of 01000.m2ts included in the STREAM, and 01000.clpi and 01000.m2ts form a clip.

Referring back to FIG. 2, the playlist directory (PLAYLIST) includes one or more PlayList files (*.rpls), wherein each PlayList file (*.rpls) includes at least one PlayItem which performs reproduction of a specific original clip. Thus, the PlayList file (*.rpls) represents playing-back (or reproducing) a desired clip combination from a combination of one or more PlayItems. More specifically, in the above-described file structure, the stream files included in the STREAM refers to files having actual user data recorded therein (i.e., AV stream files). And, the remaining directories and files are described as Management files, which include reproduction management files for reproducing the stream files. Additionally, since the Management files are information absolutely necessary for reproducing the stream files, the Management files require highly reliable protection. Accordingly, a "BACKUP directory" is provided under the BDAV directory, thereby recording backup management files within the BACKUP directory. Therefore, according to the file structure of the present invention, there are two types of Management files being recorded on the disc, each of which will be referred to as an "Original Management file" and a "Backup Management file".

Figure 6A:
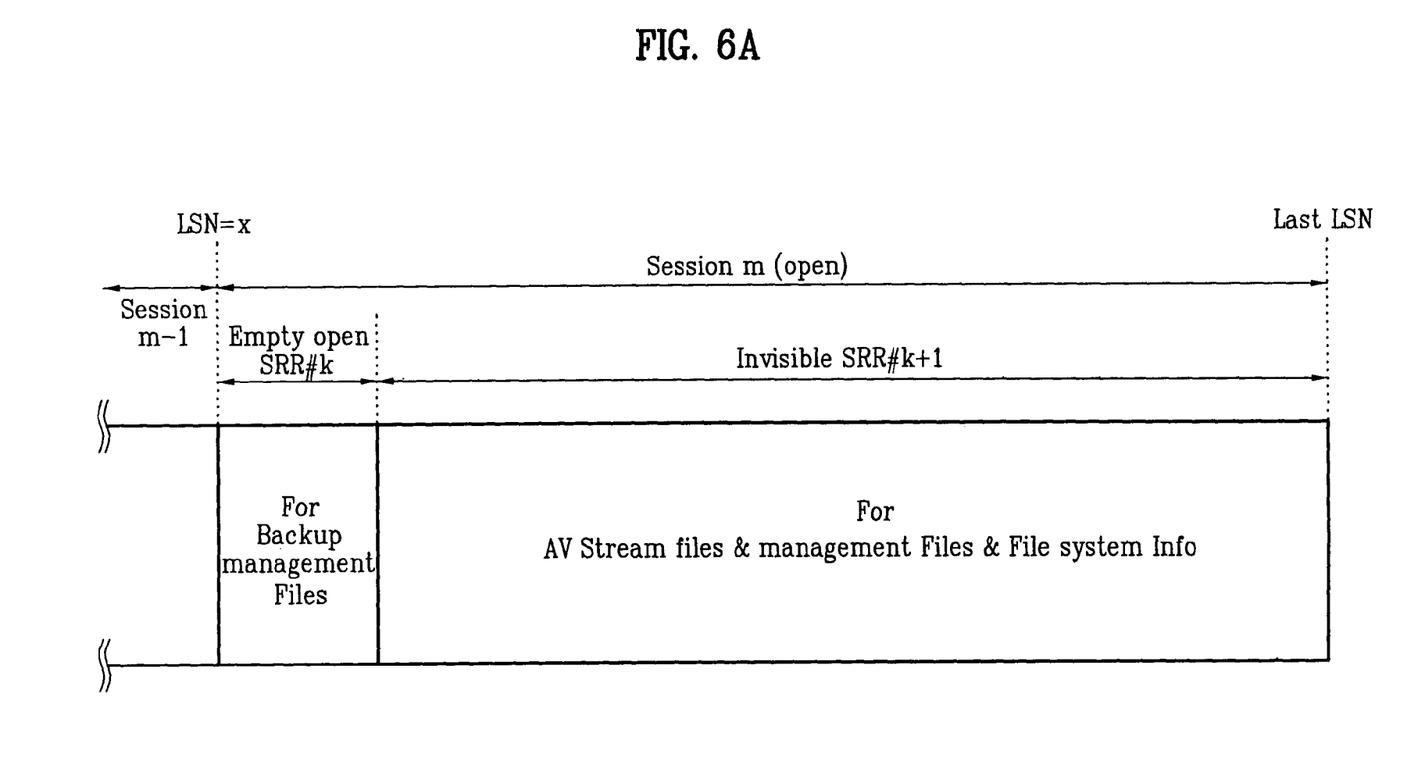
FIGS. 6A to 6C illustrate a method for recording data on the write-once optical disc according to a first embodiment of the present invention.
Figure 6B:
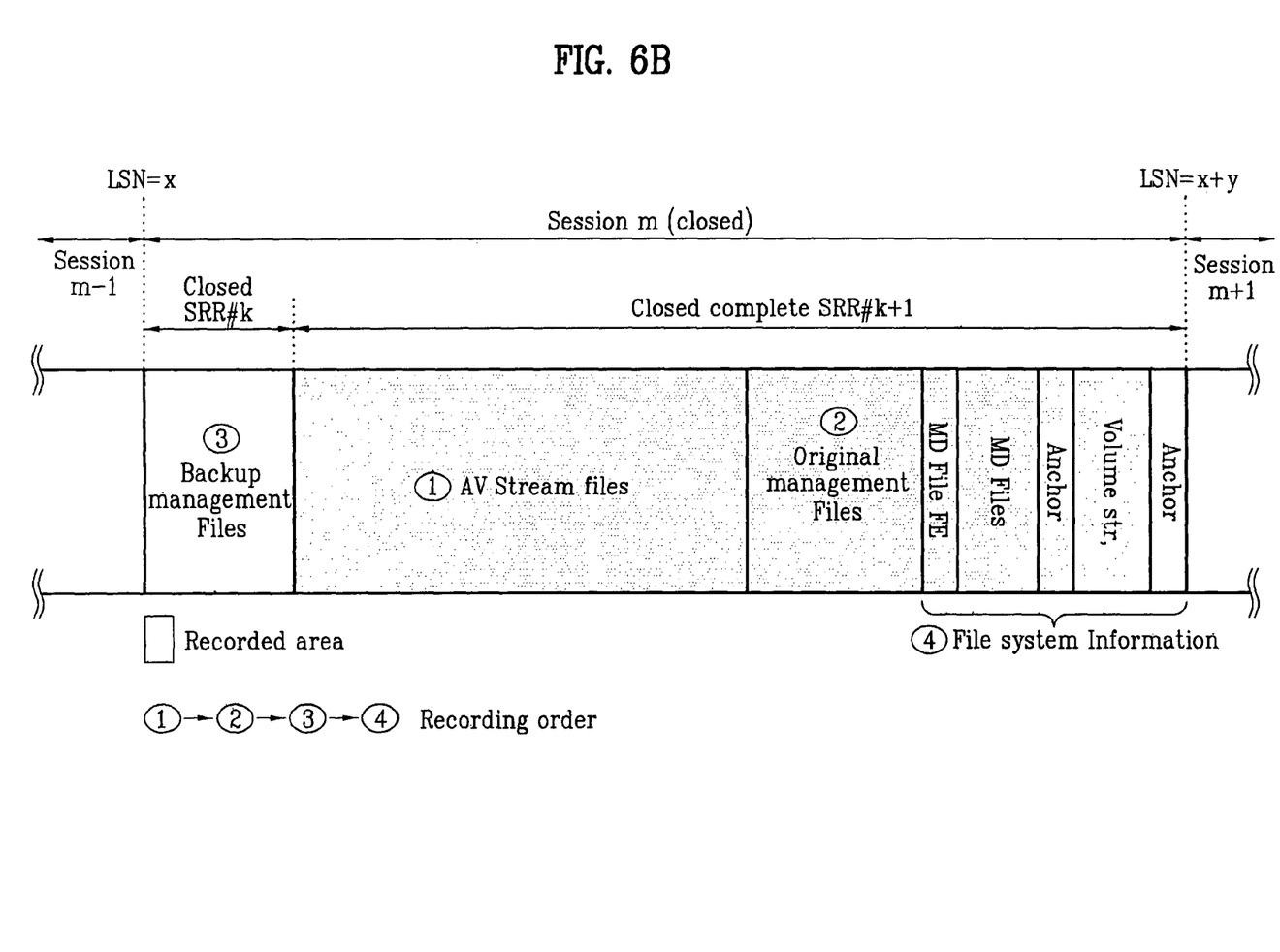
Figure 6C:
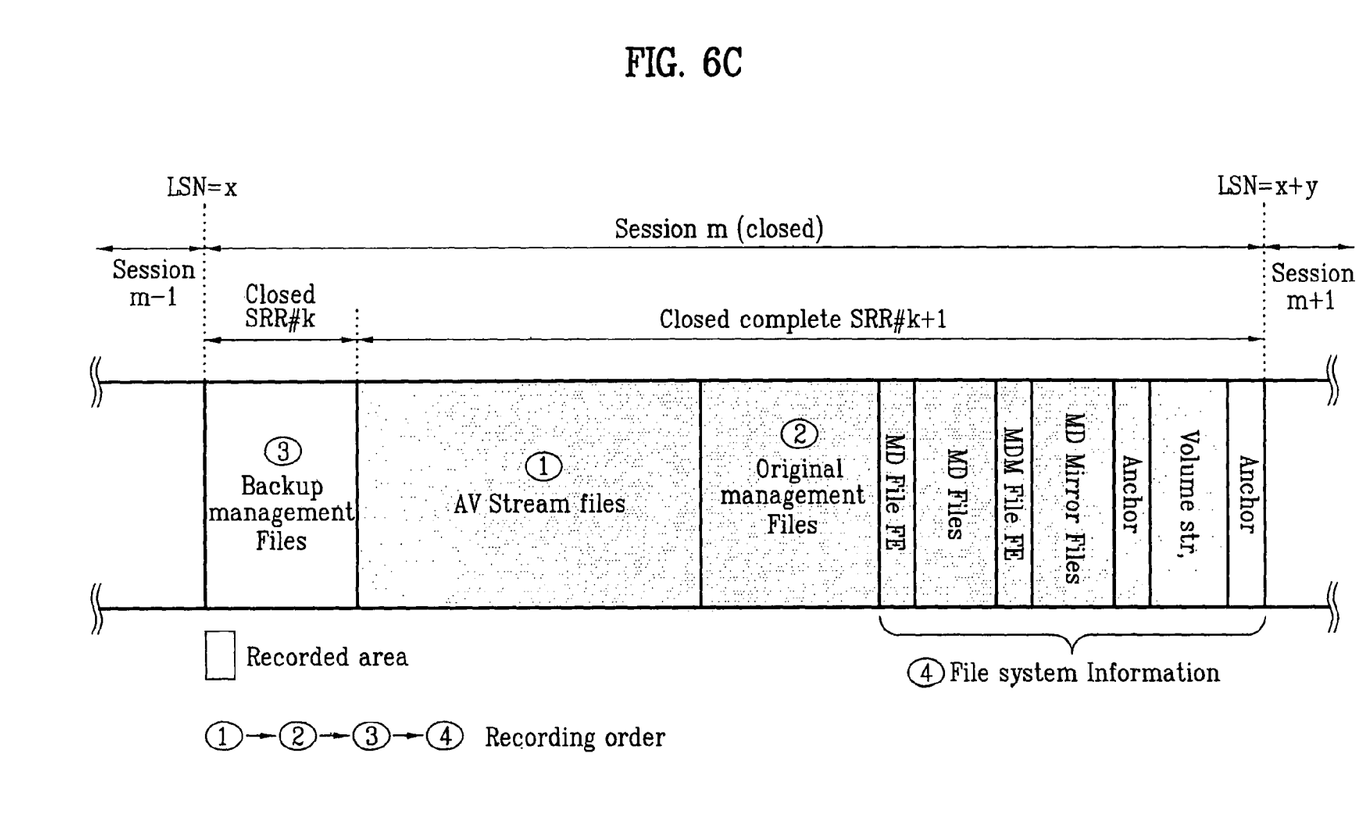

FIGS. 6A to 6C illustrate a method for recording data on the write-once optical disc according to a first embodiment of the present invention. For example, FIGS. 6A to 6C illustrate a method for recording data on a disc having the data structure shown in FIG. 5. FIG. 6A illustrates a recording area for each file in an SRR-allocated form prior to actually recording the data on the disc. For example, FIG. 6A illustrates a method for recording data on an open session (session #m). Accordingly, examples of recording data on a specific open session (session #m) will be given for simplicity of the description of the present invention. Nevertheless, it is apparent that the same principle can be equally applied to a blank disc.

More specifically, in the first embodiment according to the present invention, a first area and a second area are allocated in advance as areas for recording data. Herein, the first area is allocated for recording backup management files, and the second area is allocated for recording stream files, original management files, and file system information. In other words, by separating the location in which backup management files are recorded from the location in which original management files are recorded, the present invention can satisfy the requirement of protecting the management files. The first area corresponds to the Empty open SRR shown in FIG. 2C, and the second area corresponds to the Invisible open SRR shown in FIG. 2A. And, as each of the SRRs is numbered by increasing order, the first area may be defined as SRR #k, and the second area may be defined as SRR #k+1. The SRR #k and the SRR #k+1 defined as described above are registered in the SRRI which is recorded on the TDMA. Thus, the optical recording and reproducing apparatus (shown in FIG. 8) is able to identify the SRR #k and the SRR #k+1 as recordable areas (i.e., open SRRs) within the current optical disc.

Accordingly, since the second area refers to the Invisible SRR, this would indicate that the corresponding area has not been forcibly allocated by the user or host, and also that, if the first area is allocated as the Empty open SRR, then the remaining area would automatically be allocated as the second area (i.e., Invisible SRR). Hereinafter, for simplicity of the description of the present invention, Invisible SRRs that have been automatically created will also be described and mentioned as an allocated area.

Furthermore, when allocating the backup SRR #k, the allocated size of the corresponding area should be decided by estimating the size of the original management file. For example, in the BD-WO, a maximum of 200 of PlayList files (*.rpls) is included, which corresponds to approximately 13 kilobytes (Kbyte), a maximum of 200 Clip Information files (*.clpi) is included, which corresponds to approximately 1 megabyte (Mbyte), and a file including other information files (info.bdav) corresponding to a maximum of 12 kilobytes (Kbyte) are estimated to be allocated. Therefore, the total required file size amounts to 1.046 megabytes (Mbyte). However, since possible defects in the corresponding area should be taken into account, it is preferable to add 10% to 20% of surplus file size, and so the preferable total file size would be approximately 1.2 megabytes (Mbyte).

FIG. 6B illustrates an applied usage of the method for recording data on the first area (SRR #k) and the second area (SRR #k+1), which are allocated as shown in FIG. 6A. More specifically, the stream file which the user wishes to record is first recorded on the SRR #k+1. Then, when the recording of the desired stream file is completed, an original management file is subsequently recorded as a management file for reproducing the recorded stream file. Thereafter, a backup management file is recorded on the SRR #k, and a file system information is recorded on the SRR #k+1 in succession to the original management file. The above-described recording order is marked in numbering in FIG. 6B. Accordingly, as described above, Metadata files (MD files), a Metadata File Entry (MDFE), as well as an anchors and a Volume structure are recorded in the file system information that is recorded in the last order.

In addition, after the recording of the final file system information is completed, it is preferable to change the recordable areas SRR #k and SRR #k+1 to non-recordable areas, i.e., closed SRRs. Therefore, even when unexpected circumstances occur, such as a system error after a valid recording of the file system information, the damaged data may be validly restored (or recovered) from the closed SRR in which is the file system information has been originally recorded. Furthermore, when the corresponding session #m is closed, all of the SRRs existing within the session #m are also closed. Thereafter, data can no longer be recorded in the corresponding session, and further recording can only be performed by allocating a new open session (session #m+1). Herein, the recording method corresponds to a method of allocating an open SRR for recording the backup management file by using the same recording method as that of recording the session #m.

FIG. 6C illustrates another applied usage of the method for recording data on the first area (SRR #k) and the second area (SRR #k+1), which are allocated as shown in FIG. 6A. Referring to FIG. 6C, in comparison with FIG. 6B, when recording the file system information, not only the Metadata Files (MD Files) but also Metadata Mirror Files and a Metadata Mirror File Entry are recorded as well. Herein, the Metadata Mirror Files refer to a set of files that is additionally recorded as backup files for protecting the Metadata. More specifically, a stream file desired by the user is recorded on SRR #k+1. Then, after the recording is completed, an original file is recorded in succession as a management file for reproducing (or playing-back) the recorded stream file. Thereafter, a backup management file is recorded on SRR #k, and a file system information is recorded on SRR #k+1 in succession to the original management file. The above-described recording order is marked in numberings in FIG. 6C.

With the exception of the above-described characteristics, the recording method of FIG. 6C is identical to that of FIG. 6B and, therefore, the description of the same will be omitted for simplicity. Accordingly, as described in the first embodiment of the present invention, for example, only the process of allocating the first area (open SRR #k) for recording a "backup management file" is described. However, this is only an example of the present invention. Alternatively, it is apparent that the first area (open SRR #k) may be allocated for recording a "file system information" instead of the "backup management file". Furthermore, an area (e.g., open SRR #k, open SRR #k+1) may be allocated for recording each of the "backup management file" and the "file system information".

Figure 7A:
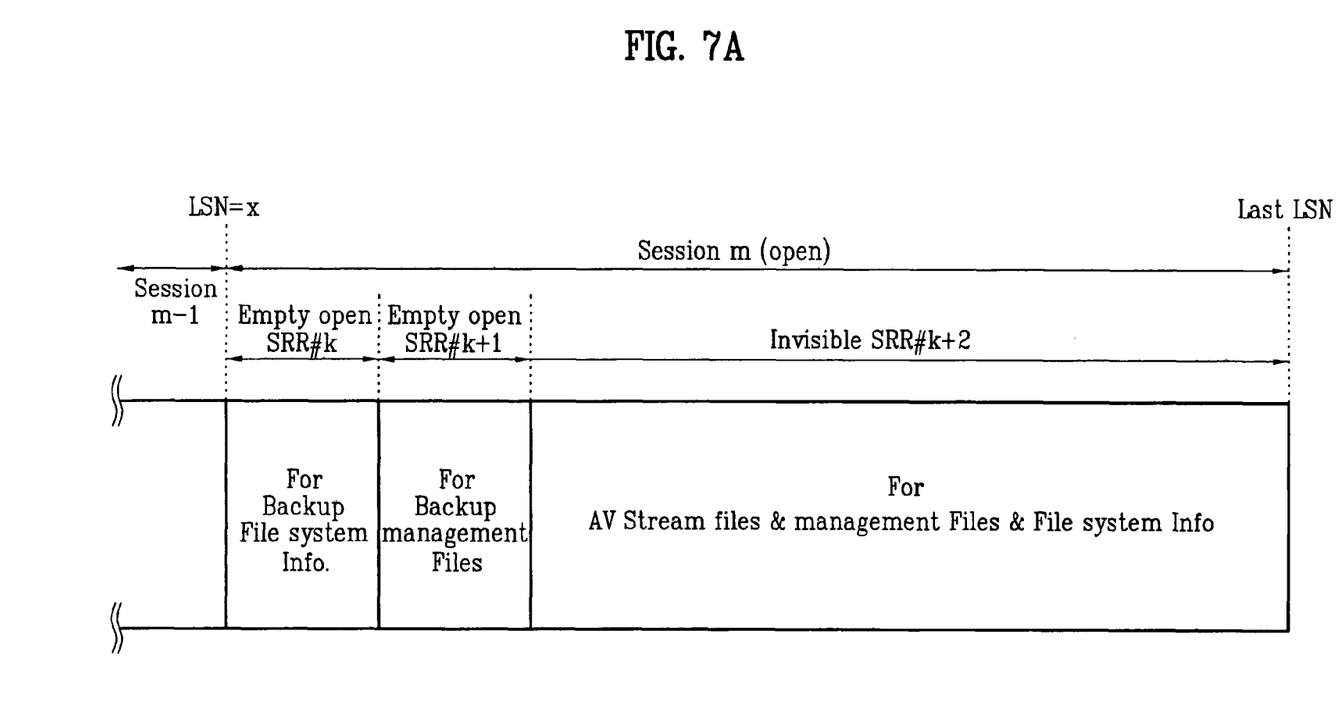
FIGS. 7A and 7B illustrate a method for recording data on the write-once optical disc according to a second embodiment of the present invention.
Figure 7B:
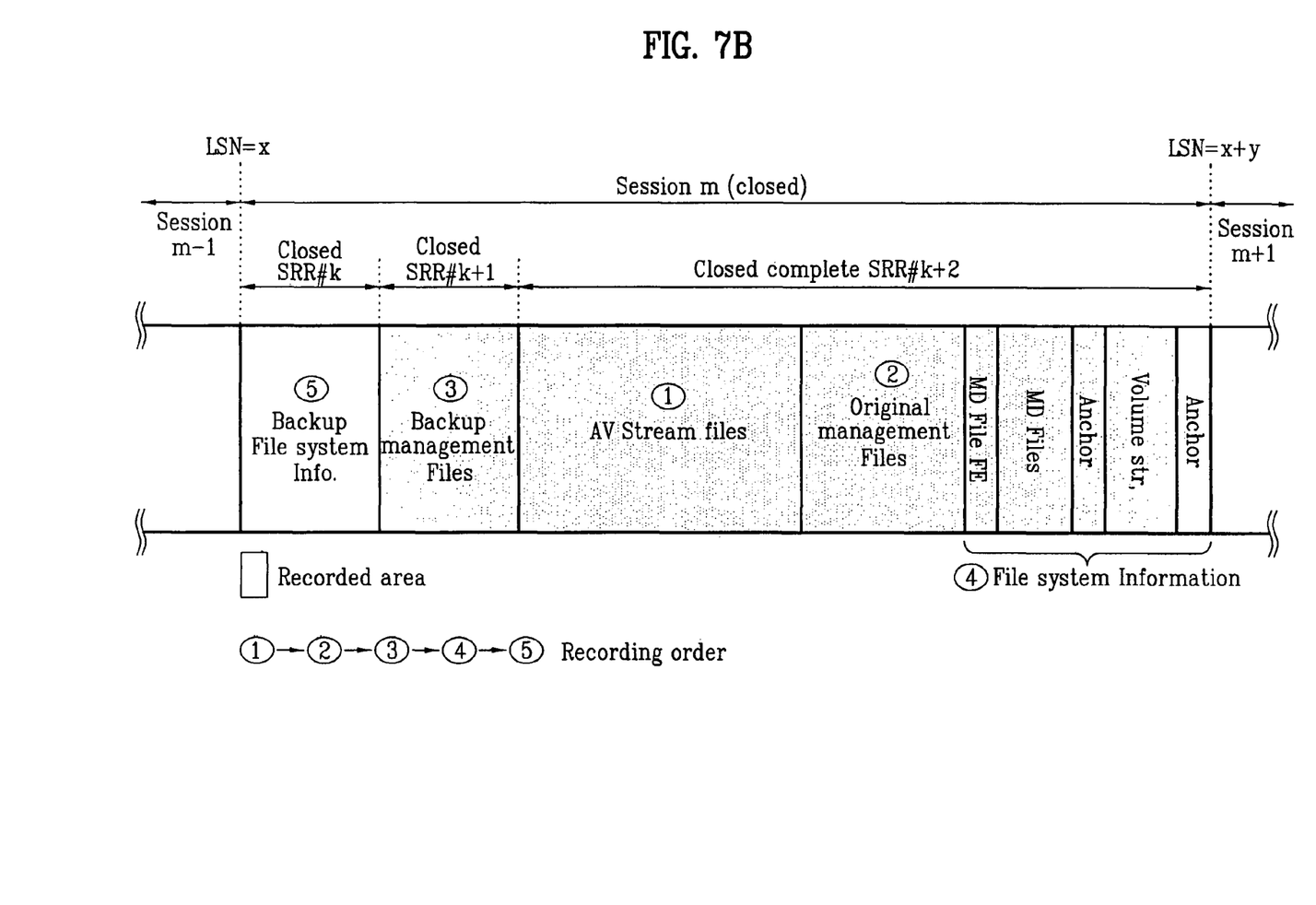

FIGS. 7A and 7B illustrate a method for recording files that may be included in the write-once optical disc according to a second embodiment of the present invention. For example, FIGS. 7A and 7B illustrate another method for recording data on the disc having the data structure described in FIG. 5. Referring to FIG. 7A, prior to actually recording data on the disc, each of the SRRs is allocated as a recording area for recording each of the files. Namely, FIG. 7A illustrates a method for recording data on an open session (session #m). Accordingly, for simplicity of the description of the present invention, an example of recording data on an open session (session #m) will be described herein. However, it is apparent that the same principle may apply when recording data on a black disc.

First of all, in the second embodiment of the present invention, a first area, a second area, and a third area are allocated as areas for recording data. More specifically, the first area is allocated for recording backup file system information, the second area is allocated for recording backup management files, and the third area is allocated for recording stream files, original management files, and file system information. In other words, by separately allocating the recording position of the backup file system information, the present invention can satisfy the object of protecting the management files and the file system information. The first area and the second area allocated as described above correspond to the Empty open SRR shown in FIG. 2C. And, the third area corresponds to the Invisible open SRR shown in FIG. 2A. As each SRR is numbered by increasing order, the first area may be defined as SRR #k, the second area may be defined as SRR #k+1, and the third area may be defined as SRR #k+2. Each of the SRR #k, SRR #k+1, and SRR #k+2, as defined above, is registered in the SRRI, which is recorded in the TDMA, thereby enabling the optical recording and reproducing apparatus (shown in FIG. 8) to identify the defined SRRs as open SRRs within the current disc. Accordingly, when allocating backup SRR #k and backup SRR #k+1, the size of the file system information and original management files should be estimated in advance.

FIG. 7B illustrates a method for recording data on the first area (open SRR #k), the second area (open SRR #k+1), and the third area (open SRR #k+2), which are allocated as shown in FIG. 7A. More specifically, a stream file desired by the user is first recorded on SRR #k+2. Then, after the recording is completed, an original management file is recorded in succession as a management file for reproducing (or playing-back) the recorded stream file. Thereafter, a backup management file is recorded on SRR #k+1, and a file system information is recorded on SRR #k+2 in succession to the original management file. Finally, a backup file system information is recorded on SRR #k. Herein, the recording order is marked in numbering in FIG. 7B for simplicity.

In addition, among the file system information, an information that requires backup may be recorded in the backup file system information, which is recorded in last order. For example, it is apparent that backup files for only the Metadata Files and the Metadata File Entry may be recorded, or that backup files for the entire file system information may be recorded. Moreover, after the backup file system information is recorded on the SRR #k+1, it is preferable that all of the recordable areas SRR #k, SRR #k+1, and SRR #k+2 are changed to non-recordable areas, i.e., closed SRRs. Therefore, even when unexpected circumstances occur, such as a system error after a valid recording of the file system information, the damaged data may be validly restored (or recovered) from the closed SRR in which is the file system information has been originally recorded. Furthermore, when the corresponding session #m is closed, all of the SRRs existing within the closed session #m are also closed, and further recording of data can no longer be performed on the corresponding session. Therefore, further recording of data should be performed on a newly allocated session (session #m+1). Herein, the recording method of the new session (session #m+1) is identical to that of session #m. In other words, the recording method is performed by allocating an open SRR for recording a backup file system information and an open SRR for recording a backup management file.

Accordingly, in the above-described second embodiment of the present invention, only the method of allocating the first area (open SRR #k) and the second area (open SRR #k+1) for recording the "backup file system information" and the "backup management file" is described. However, this is only an example of the present invention. Alternatively, it is apparent that the second area (open SRR #k+1) may be allocated for recording the "original file system information" instead of the "backup management file". Furthermore, an area (e.g., open SRR #k, open SRR #k+1) may be allocated for recording each of the "backup file system information" and the "original file system information".

Figure 8:
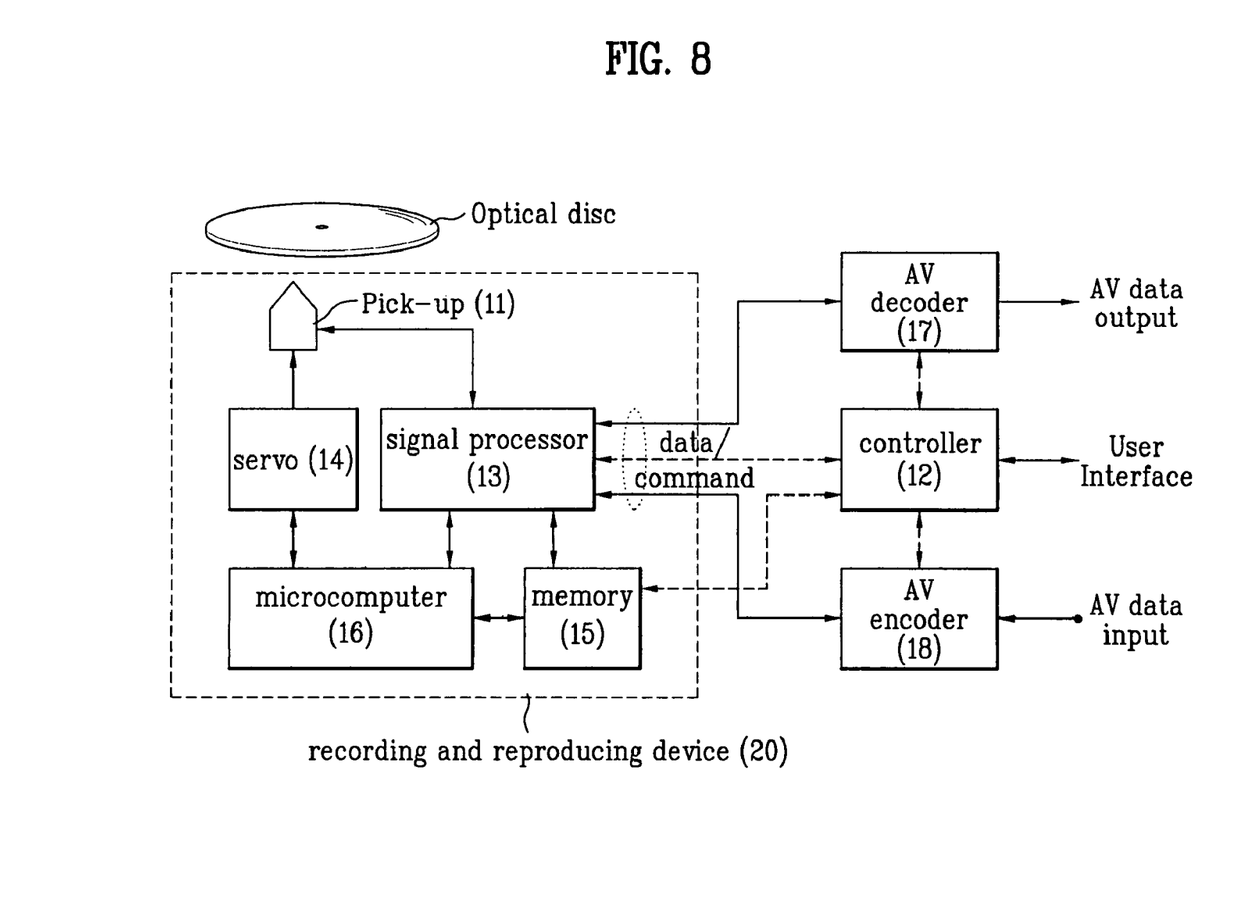
FIG. 8 illustrates an optical recording and reproducing apparatus according to the present invention.

Hereinafter, an optical recording and reproducing apparatus according to the present invention and a method for recording data on the optical disc by using the same will now be described with reference to FIG. 8. Referring to FIG. 8, the optical recording and reproducing apparatus basically includes a pick-up unit 11 for reading data and management information recorded on the optical disc, a servo 14 controlling the operations of the pick-up unit 11, a signal processor 13 either recovering the reproduction signal received from the pick-up unit 11 to a desired signal value, or modulating a signal to be recorded to an optical disc recordable signal and transmitting the modulated signal to the pick-up unit 11, a memory 15 for temporarily storing the management information read from the optical disc, and a microcomputer 16 controlling the above operations. This basic structure is referred to as a recording and reproducing device 20.

Also, a controller 12 controls the overall operation of the optical recording and reproducing apparatus. The controller 12 receives a user command through a user interface and transmits the received user command to the microcomputer 16, so that operation of the apparatus can be controlled in accordance with the user command. Most particularly, the controller 12 uses the disc management information transmitted from the recording and reproducing device 20 and creates a recording and reproducing command. Thereafter, the controller 12 transmits the command back to the recording and reproducing device 20. In addition, an AV decoder and text subtitle (Text ST) decoder 17 performs final decoding of output data in accordance with the controls of the controller 12. And, in order to perform the function of recording a signal on the optical disc, an AV encoder 18 converts an input signal into a signal of a specific format (e.g., an MPEG-2 transport stream) depending upon the controls of the controller 12 and, then, provides the converted signal to the signal processor 13.

A method for recording data on a write-once optical disc by using the above-described optical recording and reproducing apparatus will now be described in detail. When the write-once optical disc is loaded, the controller 12 allocates at least two areas in advance for recording the stream file, management file and file system information. At this point, in case of the first embodiment of the present invention (shown in FIG. 6A), when an Empty open SRR is allocated, the remaining area will automatically be allocated as Invisible SRR. Alternatively, in case of the second embodiment of the present invention (shown in FIG. 7A), when two Empty open SRRs are allocated, the remaining area will automatically be allocated as Invisible SRR.

Thereafter, the controller 12 transmits a writing (or recording) command for the data that is to be recorded on each of the area allocated as described above to the recording and reproducing device 20. After receiving the writing command, the recording and reproducing device 20 operates the pick-up unit 11 by using the servo 14 so as to complete the recording of the corresponding data on the area requested by the controller 12. Thereafter, the status for all SRRs existing within the current disc is recorded in the TDMA as the SRRI. At this point, the information being recorded as the SRRI corresponds to the LRA information having the location of the open SRRS, the start address of each SRR, and normal data recorded therein. And, such SRRI will be referred to once again by the controller 12 in a later process when creating a new writing command.

INDUSTRIAL APPLICABILITY

By using the method for allocating files according to the present invention and the method for recording data on the recording medium using the same, more reliable management files and file system information can be provided, thereby enabling efficient recording and reproduction of the optical disc to be performed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of recording data on a recording medium having a user data area, the method comprising:
    recording AV stream files in a first recording area of a session of the user data area;
    recording original management files for managing reproduction of the AV stream files adjacently to the AV stream files in the first recording area;
    recording at least one backup management file being backup of the original management files in a second recording area of the session such that the original management files and the at least one backup file are physically separated by the AV stream files;
    recording original file system information in the first recording area after the recordation of the at least one backup management file in the second recording area; and
    closing the first and second recording areas so as to change the first and second recording areas into non-recordable areas after the recordation of the original file system information.

2. The method of claim 1, further comprising:
    recording attribute information of the first and second recording areas in a temporary disc management area of the recording medium after closing the first and second recording areas.

3. The method of claim 2, wherein the attribute information includes last recorded address information of the first and second recording areas.

4. The method of claim 1, wherein each one of the first and second recording areas is sequential recording range.

5. The method of claim 1, wherein the at least one backup management file includes at least one of information, menu, mark, playlist, and clip information files.

6. The method of claim 1, wherein the at least one backup management file includes copy of at least one of the original management files.

7. The method of claim 1, further comprising:
    recording backup file system information being backup of the file system information in a third recording area of the session after the recordation of the original file system information.

8. The method of claim 7, wherein the backup file system information includes copy of at least a portion of the original file system information.

9. The method of claim 7, further comprising:
    closing the third recording area so as to change the third recording area into a non-recordable area after the recordation of the backup file system information in the third recording area.

10. The method of claim 9, further comprising:
    recording attribute information of the third recording area in a temporary disc management area of the recording medium.

11. The method of claim 10, wherein the attribute information includes last recorded address information of the third recording area.

12. The method of claim 7, wherein the original file system information includes volume structure information and file structure information.

13. The method of claim 12, wherein the backup file system information includes copy of the volume structure information and file structure information.

14. The method of claim 13, wherein the volume structure information includes volume structure descriptors and anchor information indicating locations of the volume structure descriptors.

15. The method of claim 13, wherein the file structure information includes metadata files and a first file entry indicating locations of the metadata files.

16. The method of claim 15, wherein the first file entry includes a metadata partition map if any one of the metadata files is partitioned, the metadata partition map indicating locations of the partitioned metadata file.

17. The method of claim 15, wherein the file structure information further includes metadata mirror files and a second file entry indicating locations of the metadata mirror files.

18. A recording medium comprising a lead in area, a user data area, and a lead out area, wherein the user data area includes a session, the session includes,
   a first recording area storing AV streams files, original management files for managing reproduction of the AV stream files and original file system information, the AV stream files and the original management files are recorded in the first recording area adjacently to each other, and
   a second recording area storing at least one backup management file being backup of the original management files,
   wherein the original management files and the at least one backup file are physically separated by the AV stream files, and
   wherein the first and second recording areas are non-recordable areas.

19. The recording medium of claim 18, further comprising:
   a temporary disc management area storing attribute information of the first and second recording areas.

20. The recording medium of claim 18, wherein the at least one backup management file includes at least one of information, menu, mark, playlist, and clip information files.

21. The recording medium of claim 18, wherein the user data area further includes a third recording area storing backup file system information being a copy of the original file system information.

22. The recording medium of claim 21, wherein the third recording area is a non-recordable area.

23. The recording medium of claim 21, wherein the backup file system information includes volume structure information and file structure information.

24. The recording medium of claim 23, wherein the volume structure information includes volume structure descriptors and anchor information indicating locations of the volume structure descriptors.

25. The recording medium of claim 23, wherein the file structure information includes metadata files and a first file entry indicating locations of the metadata files.

26. The recording medium of claim 25, wherein the metadata file entry includes a metadata partition map if any one of the metadata files is partitioned, the metadata partition map indicating locations of the partitioned metadata file.

27. The recording medium of claim 25, wherein the file structure information further includes metadata mirror files and a second file entry indicating locations of the metadata mirror files.

28. An apparatus for recording data on a recording medium having a user data area, the apparatus comprising:
   an optical recording device configured to record data on the recording medium; and
   a controller configured to,
   control the optical recording device to record AV stream files in a first recording area of a session of the user data area,
   control the optical recording device to record original management files for managing reproduction of the AV stream files adjacently to the AV stream files in the first recording area,
   control the optical recording device to record at least one backup management file in a second recording area of the session such that the original management files and the at least one backup file are physically separated by the AV stream files, and
   control the optical recording device to record original file system information in the first recording area after the recordation of the at least one backup management file, and
   close the first and second recording areas so as to change the first and second recording areas into non-recordable areas after the recordation of the original file system information.

29. The apparatus of claim 28, wherein the controller is further configured to control the optical recording device to record attribute information of the first and second recording areas in a temporary disc management area of the recording medium after closing the first and second recording areas.

30. The apparatus of claim 29, wherein the attribute information includes last recorded address information of the first and second recording areas.

31. The apparatus of claim 28, wherein the at least one backup management file include at least one of information, menu, mark, playlist, and clip information files.

* * * * *